(12) United States Patent
Confeiteiro

(10) Patent No.: US 12,709,910 B1
(45) Date of Patent: Aug. 18, 2026

(54) SEMI-AUTONOMOUS POOL SKIMMER

(71) Applicant: David Confeiteiro, Yonkers, NY (US)

(72) Inventor: David Confeiteiro, Yonkers, NY (US)

( * ) Notice: Subject to any disclaimer, the term of this patent is extended or adjusted under 35 U.S.C. 154(b) by 392 days.

(21) Appl. No.: 18/492,843

(22) Filed: Oct. 24, 2023

(51) Int. Cl.
*E04H 4/12* (2006.01)
*C02F 1/00* (2023.01)
*C02F 103/42* (2006.01)

(52) U.S. Cl.
CPC ........... *E04H 4/1263* (2013.01); *C02F 1/001* (2013.01); *C02F 1/008* (2013.01); *C02F 2103/42* (2013.01); *C02F 2209/006* (2013.01); *C02F 2209/008* (2013.01)

(58) Field of Classification Search
CPC ........ E04H 4/1263; C02F 1/001; C02F 1/008; C02F 2103/42; C02F 2209/006; C02F 2209/008
USPC ........ 210/85, 167.1, 167.12, 167.15, 167.19, 210/167.2, 416.2
See application file for complete search history.

(56) References Cited

U.S. PATENT DOCUMENTS 5,128,031 A 7/1992 Midkiff
5,788,850 A 8/1998 Tuomey
7,101,475 B1 * 9/2006 Maaske ................ E04H 4/1263 210/167.2
D796,128 S 8/2017 Casadio
11,105,109 B2 8/2021 Durvasula
11,112,799 B2 9/2021 Simik
2007/0235380 A1 10/2007 Cawein
2013/0334113 A1 * 12/2013 Erlich .................. E04H 4/1263 210/167.1

FOREIGN PATENT DOCUMENTS

WO 2003087501 10/2003

* cited by examiner

*Primary Examiner* — Madeline Gonzalez
(74) *Attorney, Agent, or Firm* — Kyle A. Fletcher, Esq.

(57) ABSTRACT

The semi-autonomous pool skimmer is a cleaning device. The semi-autonomous pool skimmer is an automated device for use with a pool. The semi-autonomous pool skimmer removes debris from the pool. The semi-autonomous pool skimmer includes a housing structure, a control circuit, and a filter structure. The control circuit mounts in the housing structure. The filter structure mounts on the housing structure.

12 Claims, 5 Drawing Sheets

SEMI-AUTONOMOUS POOL SKIMMER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of self-propelled cleaners. (E04H4/1654)

SUMMARY OF INVENTION

The semi-autonomous pool skimmer is a cleaning device. The semi-autonomous pool skimmer is an automated device. The semi-autonomous pool skimmer is configured for use with a pool. The semi-autonomous pool skimmer removes debris from the pool. The semi-autonomous pool skimmer comprises a housing structure, a control circuit, and a filter structure. The control circuit mounts in the housing structure. The filter structure mounts on the housing structure.

These together with additional objects, features and advantages of the semi-autonomous pool skimmer will be readily apparent to those of ordinary skill in the art upon reading the following detailed description of the presently preferred, but nonetheless illustrative, embodiments when taken in conjunction with the accompanying drawings.

In this respect, before explaining the current embodiments of the semi-autonomous pool skimmer in detail, it is to be understood that the semi-autonomous pool skimmer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the semi-autonomous pool skimmer.

It is therefore important that the claims be regarded as including such equivalent construction insofar as they do not depart from the spirit and scope of the semi-autonomous pool skimmer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
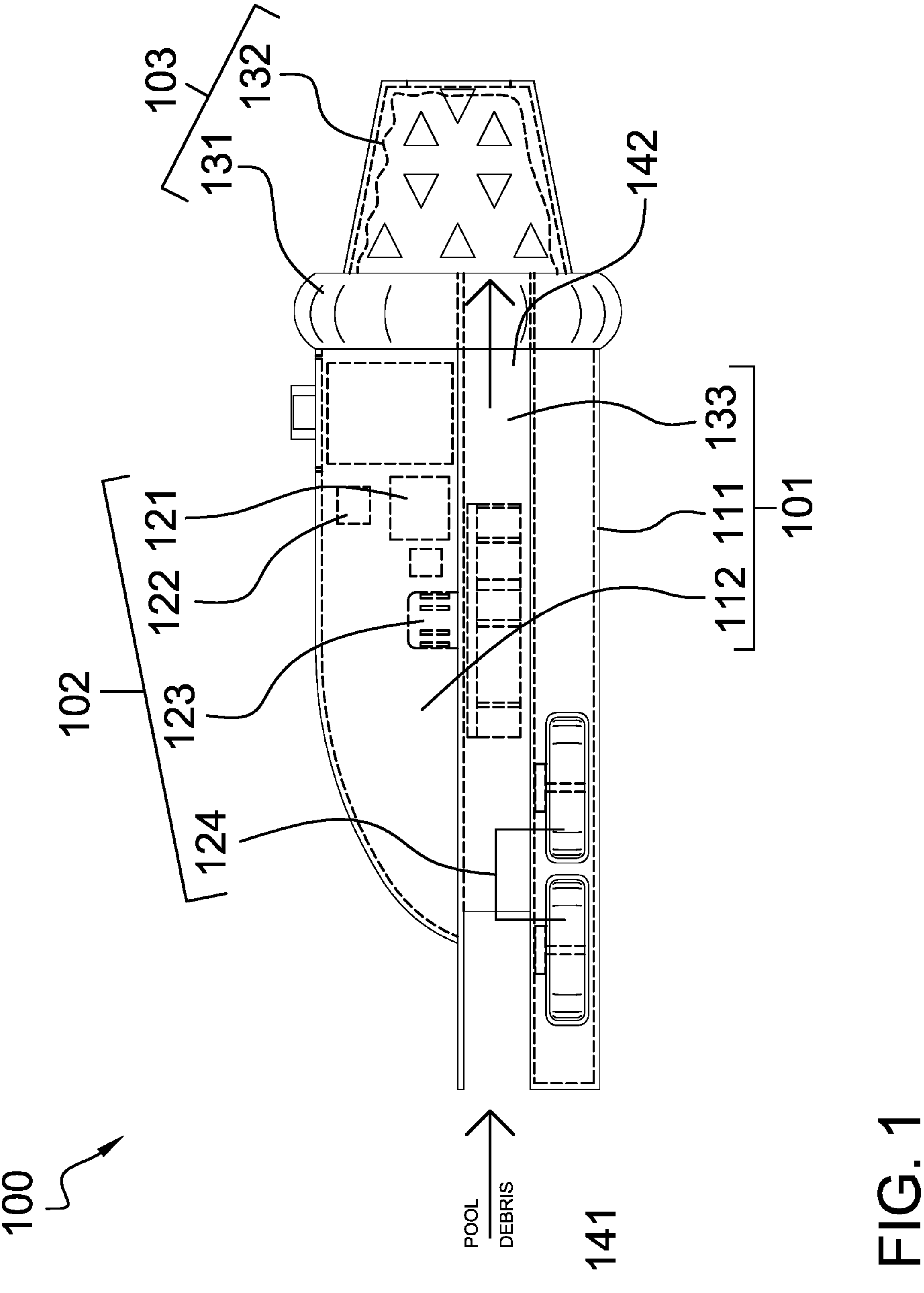
FIG. 1 is a side view of an embodiment of the disclosure.
Figure 2:
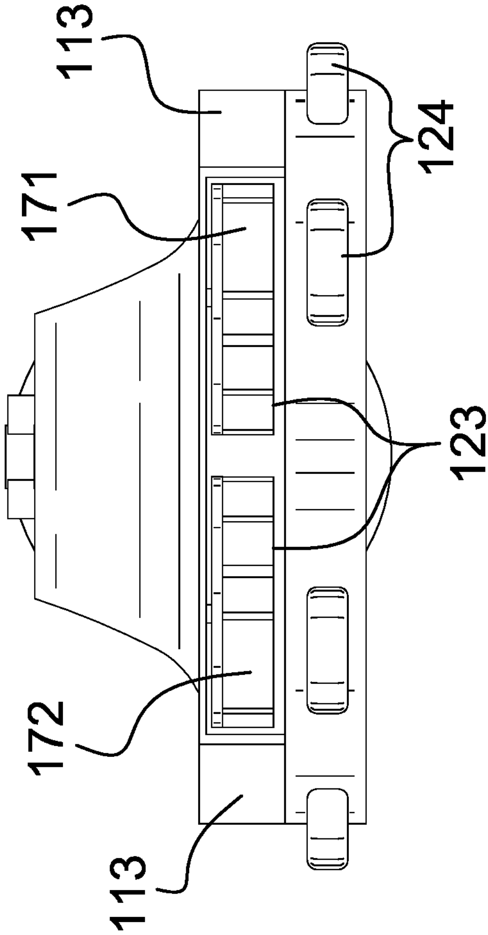
FIG. 2 is a front view of an embodiment of the disclosure.
Figure 3:
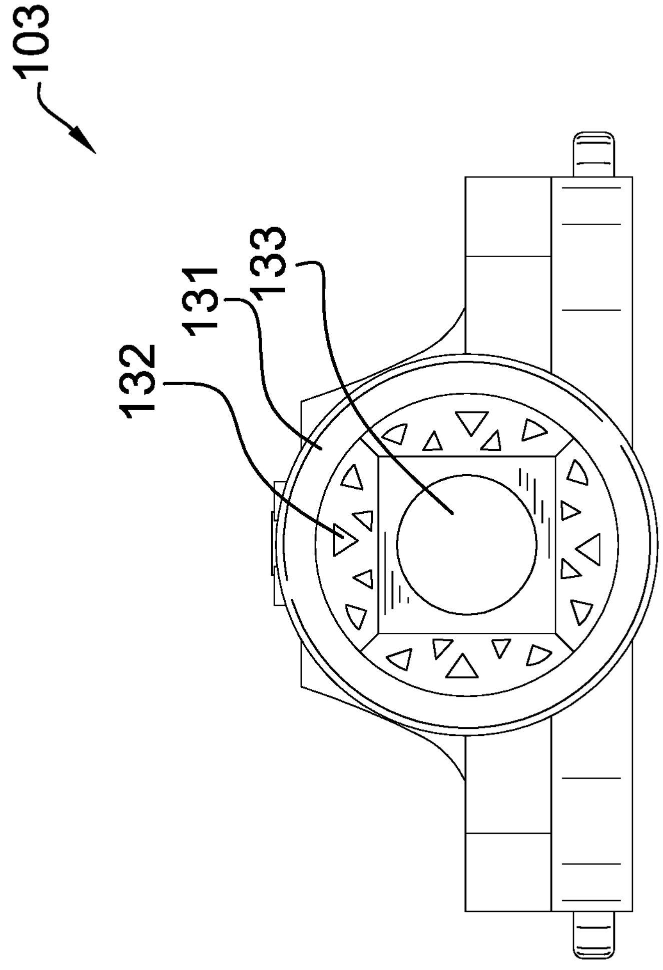
FIG. 3 is a rear view of an embodiment of the disclosure.
Figure 4:
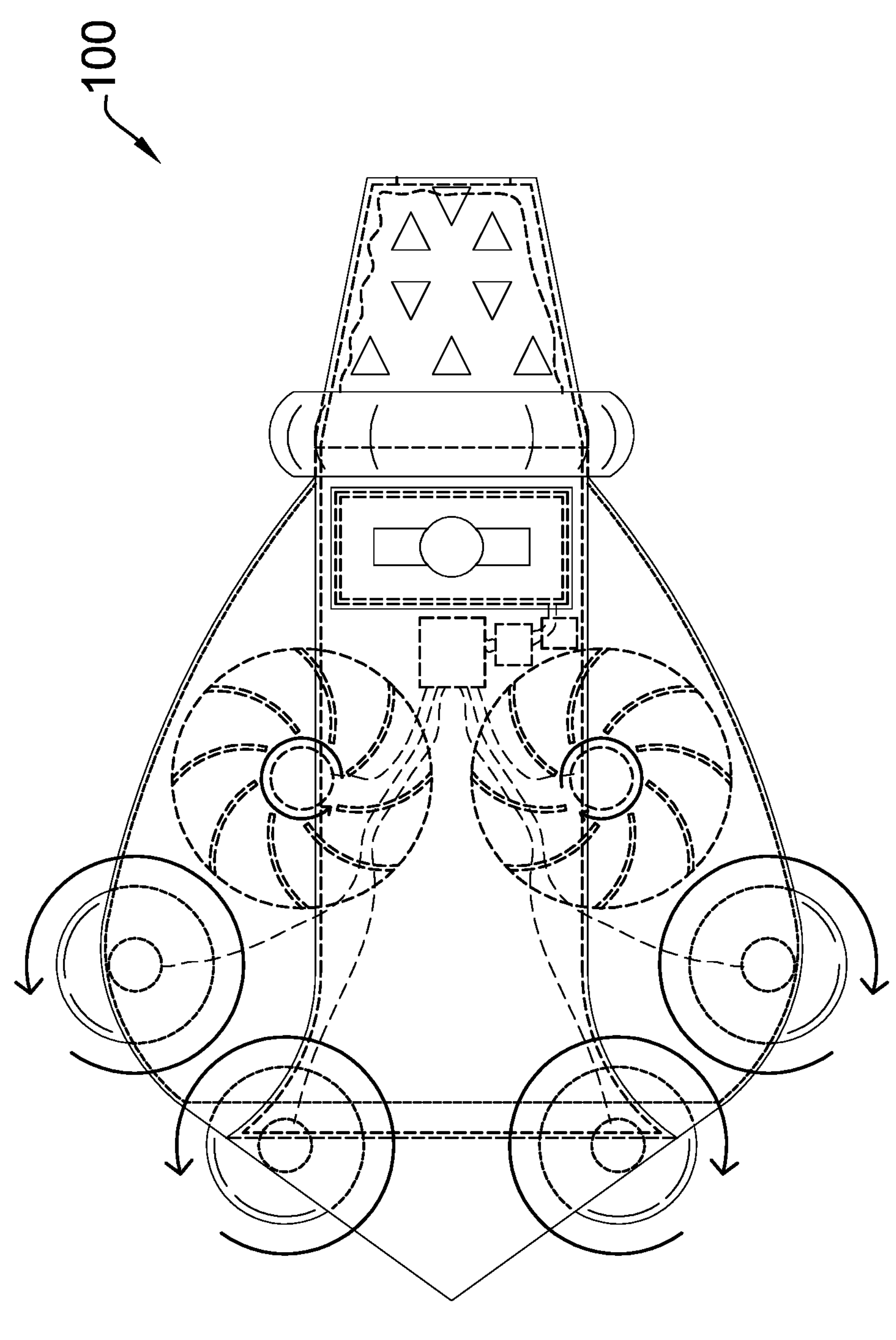
FIG. 4 is a top view of an embodiment of the disclosure.
Figure 5:
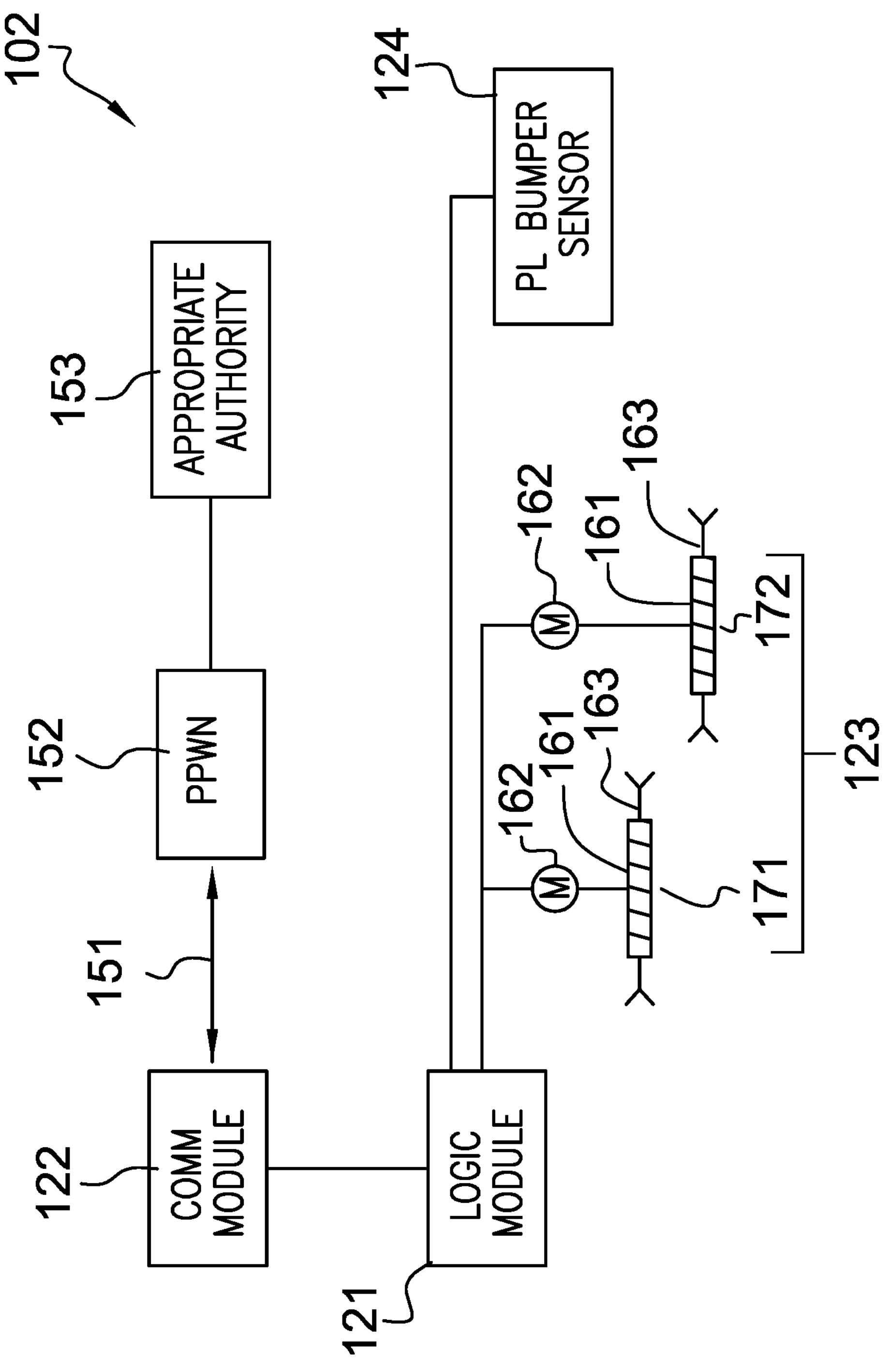
FIG. 5 is a schematic view of an embodiment of the disclosure.

Detailed reference will now be made to one or more potential embodiments of the disclosure, which are illustrated in FIGS. 1 through 5.

The semi-autonomous pool skimmer 100 (hereinafter invention) is a cleaning device. The invention 100 is an automated device. The invention 100 is configured for use with a pool. The invention 100 removes debris from the pool. The invention 100 comprises a housing structure 101, a control circuit 102, and a filter structure 103. The control circuit 102 mounts in the housing structure 101. The filter structure 103 mounts on the housing structure 101.

The housing structure 101 is a rigid structure. The housing structure 101 is a buoyant structure. The housing structure 101 forms a protected space that contains the control circuit 102. The housing structure 101 captures water from the pool. The housing structure 101 comprises a shell housing 111, a control housing 112, a buoyancy chamber 113, and a filter channel 133.

The housing structure 101 forms a filter channel 133 that transports the captured water to the filter structure 103. The filter structure 103 mounts on the housing structure 101. The filter channel 133 further comprises an intake port 141 and a discharge port 142. The filter channel 133 is a fluid transport channel. The filter channel 133 takes water into the shell housing 111 through the intake port 141. The filter channel 133 discharges the transported water through the discharge port 142 into the filter sock 132.

The shell housing 111 is a rigid structure. The shell housing 111 forms the exterior surfaces of the housing structure 101.

The control housing 112 is a chamber that is formed in the housing structure 101. The control housing 112 forms the protected space of the housing structure 101 that contains the control circuit 102. The protected space formed by the control housing 112 protects the control circuit 102 from water.

The buoyancy chamber 113 is a negative space that is formed within the housing structure 101. The buoyancy chamber 113 is a hollow space. The buoyancy chamber 113 is a fluid impermeable structure. The buoyancy chamber 113 provides the buoyancy that allows the housing structure 101 to float.

The control circuit 102 is an electric circuit. The control circuit 102 controls the operation of the invention 100. The control circuit 102 provides the motive forces that move the invention 100 within the pool. The control circuit 102 provides the forces that generate a water flow that flows through the filter structure 103. The control circuit 102 is an independently powered electric circuit. By independently powered is meant that the control circuit 102 can operate without an electrical connection to an external power source. The control circuit 102 comprises a logic module 121, a communication module 122, a plurality of impeller devices 123, and a plurality of bumper structures 124. The logic module 121, the communication module 122, the plurality of impeller devices 123, and the plurality of bumper structures 124 are electrically interconnected.

The logic module 121 is an electronic device that is used to manage, regulate, and operate the control circuit 102. The communication module 122 is a wireless electronic communication device that allows the logic module 121 to wirelessly communicate with an appropriate authority 153. The communication module 122 further comprises a wireless communication link 151, a commercially provided and publicly available cellular wireless network 152, and the appropriate authority 153. The communication module 122 forms the wireless communication link 151 with the commercially provided and publicly available cellular wireless network 152. The commercially provided and publicly available cellular wireless network 152 establishes a communication link with the appropriate authority 153. The communication module 122 exchanges one or more direct messaging facilities that are transmitted over the wireless communication link 151 to the appropriate authority 153. The message contained in the direct messaging facility contains the operating instructions that are provided by the appropriate authority 153.

In the first potential embodiment of the disclosure, the communication module 122 communicates the direct messaging facilities as SMS and MMS messages between the logic module 121 and the appropriate authority through the commercially provided and publicly available cellular wireless network 152. The use of a commercially provided and publicly available cellular wireless network is preferred because: a) of its low cost; b) of the widespread availability and the broad interoperability between competing commercially provided and publicly available cellular wireless networks; and, c) methods and techniques to send SMS and MMS messages over a commercially provided and publicly available cellular wireless network are well known and documented by those skilled in the electrical arts.

Each impeller device selected from the plurality of impeller devices 123 is an electric circuit. Each impeller device selected from the plurality of impeller devices 123 converts electric energy into rotational energy. Each impeller device selected from the plurality of impeller devices 123 converts the generated rotational energy into a flow of water that propels the housing structure 101 through the pool. Each impeller device selected from the plurality of impeller devices 123 electrically connects to the logic module 121. The logic module 121 independently controls the operation of each impeller device selected from the plurality of impeller devices 123. The plurality of impeller devices 123 further comprises an impeller structure 161, an impeller motor 162, and an impeller channel 163.

The impeller structure 161 is a mechanical structure. The impeller structure 161 is a bladed structure. The impeller structure 161 mounts in the impeller channel 163. The impeller structure 161 forms a mechanical linkage with the impeller motor 162. The impeller structure 161 is a rotating structure. The impeller structure 161 generates a pressure differential within the impeller channel 163 that: a) draws water into the impeller channel 163; b) transports the drawn water through the impeller channel 163; and, c) discharges water from the impeller channel 163 back into the pool. Each impeller structure 161 generates a motive force that moves the housing structure 101 through the water.

The impeller motor 162 is an electrically powered motor. The impeller motor 162 converts electric energy into rotational energy. The impeller motor 162 transfers the rotational energy to the impeller structure 161. The impeller structure 161 uses the received rotational energy to pump the water through the impeller channel 163.

The impeller motor 162 electrically connects to the logic module 121. The logic module 121 controls the operation of the impeller motor 162. By controlling the operation of the logic module 121 is meant that the logic module 121 controls the speed and the direction of rotation of the impeller motor 162.

The impeller channel 163 is a fluid transport channel. The impeller channel 163 takes water into the shell housing 111 through a forward port formed through the shell housing 111. The impeller channel 163 discharges the transported water through the shell housing 111 for discharge through an aft port formed through the shell housing 111.

The plurality of impeller devices 123 further comprises a first impeller device 171 and a second impeller device 172. The first impeller device 171 is a first impeller device 171 selected from the plurality of impeller devices 123. The second impeller device 172 is a second impeller device 172 selected from the plurality of impeller devices 123.

Each bumper structure selected from the plurality of bumper structures 124 mounts on the exterior surface of the shell housing 111. Each bumper structure selected from the plurality of bumper structures 124 is a pressure sensor. Each bumper structure selected from the plurality of bumper structures 124 is positioned such that the selected bumper structure detects when the housing structure 101 hits the boundary of the pool. Each bumper structure selected from the plurality of bumper structures 124 electrically connects to the logic module 121. The logic module 121 monitors each bumper structure selected from the plurality of bumper structures 124. The logic module 121 adjusts the speed of the rotation of the impeller motor 162 of the second impeller device 172 relative to the speed of rotation of the impeller motor 162 of the first impeller device to adjust the direction of motion of the housing structure 101 in the pool.

The filter structure 103 is a mechanical apparatus. The filter structure 103 receives water from the impeller structure 161. The filter structure 103 filters the received water through a surface filter. The filter structure 103 discharges the filtered water back into the pool. The filter structure 103 comprises a filter mount 131 and a filter sock 132.

The filter mount 131 is a mechanical structure. The filter mount 131 attaches to the discharge port 142 of the filter channel 133. The filter mount 131 forms the structure that attaches the filter sock 132 to the filter channel 133. The filter mount 131 positions the filter sock 132 within the flow path of the water that moves through the filter channel 133.

The filter sock 132 is a sheeting structure. The filter sock 132 is a textile based structure. The filter sock 132 has a mesh structure. The filter sock 132 forms a surface filter that filters debris out of the water that flows through the filter sock 132.

The following definitions were used in this disclosure:

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Automatic: As used in this disclosure, automatic refers to a device, process, or a system that operates without human control, supervision or participation in the operation of the device, process, or system. The verb form of automatic is to automate.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Buoyancy: As used in this disclosure, buoyancy refers to a property of an object that floats in a liquid. The object that floats in the liquid is referred to as buoyant. Buoyancy specifically refers to the situation where the mass of the liquid that is displaced when a buoyant object is placed in the liquid is greater than the mass of the object itself. In this instance, the pressure of the displaced liquid will raise the buoyant object such that the buoyant object floats.

Centrifugal Pump: As used in this disclosure, a centrifugal pump is a mechanical device that converts rotational energy into a pressure differential used to move a fluid in a linear direction. The centrifugal pump is driven by a rotating structure known as an impeller.

Chamber: As used in this disclosure, a chamber is an enclosed or enclosable negative space that is dedicated to a purpose.

Commercially Provided and Publicly Available Cellular Wireless Network: As used in this disclosure, a commercially provided and publicly available cellular wireless network refers to subscription based publicly available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Control Circuit: As used in this disclosure, a control circuit is an electrical circuit that manages and regulates the behavior or operation of a device.

Debris: As used in this disclosure, debris refers to an accumulation of unwanted material on a surface.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Filter: As used in this disclosure, a filter is a mechanical device that is used to separate solids that are suspended in a liquid or a gas. A strainer is a type of coarse filter.

Float: As used in this object, float refers to an object that is buoyant, or does not sink into a liquid.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force Sensor: As used in this disclosure, the force sensor is a sensor that generates an electrically measurable signal that is a function of the amount of force applied to the force sensor. The force sensor is often referred to as a pressure sensor. The force sensor commonly measures force using the piezoelectric effect generated by the deformation of a material. A pressure sensor is a force sensor calibrated to measure force per unit area.

GPS: As used in this disclosure, and depending on the context, GPS refers to: a) a system of navigational satellites that are used to determine the position, known as GPS coordinates, and velocity of a person or object; b) the system of navigational satellites referred to in the first definition that are used to synchronize to global time; or, c) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Gas: As used in this disclosure, a gas refers to a state (phase) of matter that is fluid and that fills the volume of the structure that contains it. Stated differently, the volume of a gas always equals the volume of its container.

Housing: As used in this disclosure, a housing is a rigid structure that encloses and protects one or more devices.

Impeller: As used in this disclosure, an impeller refers to the rotating structure of a centrifugal pump. The rotation of the impeller generates the pressure differential that is used to create a fluid flow.

Liquid: As used in this disclosure, a liquid refers to a state (phase) of matter that is fluid and that maintains, for a given pressure, a fixed volume that is independent of the volume of the container.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Mesh: As used in this disclosure, the term mesh refers to an openwork fabric made from threads, yarns, cords, wires, or lines that are woven, knotted, or otherwise twisted or intertwined at regular intervals. Synonyms for mesh include net. A mesh structure formed from metal bars or wires is often referred to as a grate.

Messaging Facility: As used in this disclosure, a messaging facility is a previously determined formatting structure through which a text or image (referred to in this definition as text) based communication is transmitted for delivery. A messaging facility is selected from the group consisting of a traditional messaging facility, a direct messaging facility and a broadcast messaging facility. A traditional messaging facility includes the delivery of a physical object containing the text based communication. The direct messaging facility includes communications that are addressed to a previously identified group of recipients. The broadcast messaging facility includes communications that are transmitted without the prior identification of the intended group of recipients. An example of a traditional messaging facility includes, but is not limited to, postal delivery. Examples of a direct messaging facilities include, but are not limited to, email, audio based communications, and SMS messages. A social media service is an example of a broadcast messaging facility.

Motor: As used in this disclosure, a motor refers to the method of transferring energy from an external power source into rotational mechanical energy.

PDD: As used in this disclosure, PDD is an acronym for personal data device.

Personal Data Device: As used in this disclosure, a personal data device is a handheld logical device that is used for managing personal information and communication. Examples of personal data device include, but are not limited to, cellular phones, tablets, and smartphones.

Phase: As used in this disclosure, phase refers to the state of the form of matter. The common states of matter are solid, liquid, gas, and plasma.

Pool: As used in this disclosure, a pool is a self-contained body of water. By self-contained is meant that fluidic connections between the pool and the other bodies of water do not result in a significant change or difference in the water volume contained in the pool over a 24 hour period. A pool can be naturally formed or a manufactured structure. When the pool is a manufactured structure, the horizontal surface surrounding the perimeter the pool is called an apron. When the pool is a natural structure, the ground surrounding the perimeter of the pool is called the shore.

PPWN: As used in this disclosure, the PPWN is an acronym for publicly provided wireless network. The PPWN refers to a commercially provided and publicly available cellular wireless network.

Pressure: As used in this disclosure, pressure refers to a measure of force per unit area.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Rigid Structure: As used in this disclosure, a rigid structure is a solid structure formed from an inelastic material that resists changes in shape. A rigid structure will permanently deform as it fails under a force. See bimodal flexible structure.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

Solid: As used in this disclosure, a solid refers to a state (phase) of matter that: 1) has a fixed volume; and, 2) does not flow.

Subscription: As used in this disclosure, a subscription refers to a contractual arrangement for the delivery of a product or access to a service on a recurring basis. The subscribed product or service can be provided on a continuous basis or on a scheduled basis. The term subscription often implies that the subscribed product or service has been paid for in advance.

Surface Filter: As used in this disclosure, a surface filter is a type of filter wherein the fluid is passed through a surface or membrane, such as a screen or paper that allows for the passage of the fluid but blocks the passage of larger particles that may be suspended in the fluid. The construction of a surface filter would allow for the passage of the fluid through several filter surfaces in one filtration unit.

Textile: As used in this disclosure, a textile is a material that is woven, knitted, braided or felted. Synonyms in common usage for this definition include fabric and cloth. The two surfaces of the textile with the greatest surface area are called the faces of the textile.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

Wireless Communication Link: As used in this disclosure, a wireless communication link is a previously determined channel that is used to wirelessly exchange information between one or more transceivers.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A semi-autonomous pool skimmer comprising a housing structure, a control circuit, and a filter structure;

wherein the control circuit mounts in the housing structure;

wherein the filter structure mounts on the housing structure;

wherein the filter structure receives water from an impeller structure;

wherein the filter structure filters the received water through a surface filter;

wherein the filter structure discharges the filtered water;

wherein an impeller motor and an impeller channel is included;

wherein the impeller structure is a bladed structure;

wherein the impeller structure mounts in the impeller channel;

wherein the impeller structure forms a mechanical linkage with the impeller motor;

wherein the impeller channel is a fluid transport channel;

wherein the impeller channel takes water into a shell housing of the housing structure through a forward port formed through the shell housing;

wherein the impeller channel discharges the transported water through the shell housing for discharge through an aft port formed through the shell housing.

2. The semi-autonomous pool skimmer according to claim 1 wherein the semi-autonomous pool skimmer is a cleaning device;

wherein the semi-autonomous pool skimmer is an automated device.

3. The semi-autonomous pool skimmer according to claim 2 wherein the housing structure is a rigid structure;

wherein the housing structure is a buoyant structure;

wherein the housing structure forms a protected space that contains the control circuit;

wherein the housing structure captures water.

4. The semi-autonomous pool skimmer according to claim 3 wherein the control circuit is an electric circuit;

wherein the control circuit controls the operation of the semi-autonomous pool skimmer;

wherein the control circuit provides the motive forces that move the semi-autonomous pool skimmer;

wherein the control circuit provides the forces that generate a water flow that flows through the filter structure;

wherein the control circuit is an independently powered electric circuit;

wherein by independently powered is meant that the control circuit can operate without an electrical connection to an external power source.

5. The semi-autonomous pool skimmer according to claim 4 wherein the housing structure comprises the shell housing, a control housing, a buoyancy chamber, and a filter channel;

wherein the filter channel that transports the water to the filter structure;

wherein the filter channel further comprises an intake port and a discharge port;

wherein the filter channel is a fluid transport channel;

wherein the filter channel takes water into the shell housing through the intake port;

wherein the filter channel discharges the transported water through the discharge port into the filter structure;

wherein the shell housing is a rigid structure;

wherein the shell housing forms the exterior surfaces of the housing structure;

wherein the control housing is a chamber that is formed in the housing structure;

wherein the control housing forms the protected space of the housing structure that contains the control circuit;

wherein the protected space formed by the control housing protects the control circuit from water;

wherein the buoyancy chamber is a negative space that is formed within the housing structure;

wherein the buoyancy chamber is a hollow space;

wherein the buoyancy chamber is a fluid impermeable structure;

wherein the buoyancy chamber provides the buoyancy that allows the housing structure to float.

6. The semi-autonomous pool skimmer according to claim 5 wherein the control circuit comprises a logic module, a communication module, a plurality of impeller devices, and a plurality of bumper structures;

wherein the logic module, the communication module, the plurality of impeller devices, and the plurality of bumper structures are electrically interconnected.

7. The semi-autonomous pool skimmer according to claim 6 wherein the logic module is an electronic device;

wherein the communication module is a wireless electronic communication device that allows the logic module to wirelessly communicate with an appropriate authority;

wherein the communication module further comprises a wireless communication link, a commercially provided and publicly available cellular wireless network, and the appropriate authority;

wherein the communication module forms the wireless communication link with the commercially provided and publicly available cellular wireless network;

wherein the commercially provided and publicly available cellular wireless network establishes a communication link with the appropriate authority;

wherein the communication module exchanges one or more direct messaging facilities that are transmitted over the wireless communication link to the appropriate authority;

wherein the message contained in the direct messaging facility contains the operating instructions that are provided by the appropriate authority.

8. The semi-autonomous pool skimmer according to claim 7 wherein each impeller device selected from the plurality of impeller devices is an electric circuit;

wherein each impeller device selected from the plurality of impeller devices converts electric energy into rotational energy;

wherein each impeller device selected from the plurality of impeller devices converts the generated rotational energy into a flow of water that propels the housing structure;

wherein each impeller device selected from the plurality of impeller devices electrically connects to the logic module;

wherein the logic module independently controls the operation of each impeller device selected from the plurality of impeller devices;

wherein the impeller structure is a rotating structure;

wherein each impeller structure generates a motive force that moves the housing structure through the water.

9. The semi-autonomous pool skimmer according to claim 8 wherein the impeller motor is an electrically powered motor;

wherein the impeller motor converts electric energy into rotational energy;

wherein the impeller motor transfers the rotational energy to the impeller structure;

wherein the impeller structure uses the received rotational energy to pump the water through the impeller channel;

wherein the impeller motor electrically connects to the logic module;

wherein the logic module controls the operation of the impeller motor;

wherein by controlling the operation of the logic module is meant that the logic module controls the speed and the direction of rotation of the impeller motor.

10. The semi-autonomous pool skimmer according to claim 9 wherein each bumper structure selected from the plurality of bumper structures mounts on the exterior surface of the shell housing;

wherein each bumper structure selected from the plurality of bumper structures is a pressure sensor;

wherein each bumper structure selected from the plurality of bumper structures is positioned such that the selected bumper structure detects when the housing structure hits a boundary;

wherein each bumper structure selected from the plurality of bumper structures electrically connects to the logic module;

wherein the logic module monitors each bumper structure selected from the plurality of bumper structures.

11. The semi-autonomous pool skimmer according to claim 10 wherein the plurality of impeller devices further comprises a first impeller device and a second impeller device;

wherein the first impeller device is a first impeller device selected from the plurality of impeller devices;

wherein the second impeller device is a second impeller device selected from the plurality of impeller devices;

wherein the logic module adjusts the speed of the rotation of the impeller motor of the second impeller device relative to the speed of rotation of the impeller motor of the first impeller device to adjust the direction of motion of the housing structure.

12. The semi-autonomous pool skimmer according to claim 11 wherein the filter structure comprises a filter mount and a filter sock;

wherein the filter mount is a mechanical structure;

wherein the filter mount attaches to the discharge port of the filter channel;

wherein the filter mount forms the structure that attaches the filter sock to the filter channel;

wherein the filter mount positions the filter sock within the flow path of the water that moves through the filter channel;

wherein the filter sock is a sheeting structure;

wherein the filter sock is a textile based structure;

wherein the filter sock has a mesh structure;

wherein the filter sock forms a surface filter that filters debris out of the water that flows through the filter sock.

* * * * *